(12) United States Patent
Kawashima

(10) Patent No.: US 8,159,547 B2
(45) Date of Patent: Apr. 17, 2012

(54) IMAGING APPARATUS AND MICROSCOPE APPARATUS USING THE SAME

(75) Inventor: Takayuki Kawashima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1195 days.

(21) Appl. No.: 11/658,752

(22) PCT Filed: Jul. 27, 2005

(86) PCT No.: PCT/JP2005/013758
§ 371 (c)(1),
(2), (4) Date: Nov. 8, 2007

(87) PCT Pub. No.: WO2006/011526
PCT Pub. Date: Feb. 2, 2006

(65) Prior Publication Data
US 2008/0192137 A1    Aug. 14, 2008

(30) Foreign Application Priority Data
Jul. 30, 2004  (JP) ............................... P2004-224523

(51) Int. Cl.
*H04N 5/225* (2006.01)
*H04N 5/232* (2006.01)
*H04N 9/73* (2006.01)
*H04N 5/262* (2006.01)

(52) U.S. Cl. ........ 348/216; 348/220; 348/211; 348/228; 348/239

(58) Field of Classification Search .................. 348/216, 348/220, 211, 228, 239
See application file for complete search history.

(56) References Cited

U.S. PATENT DOCUMENTS

| 7,358,988 B1 * | 4/2008 | Konishi et al. ............. 348/222.1 |
| 2003/0071906 A1 * | 4/2003 | Matsumoto ................... 348/241 |
| 2003/0090577 A1 * | 5/2003 | Shirakawa ................. 348/222.1 |
| 2003/0164885 A1 * | 9/2003 | Tanaka et al. .............. 348/229.1 |

FOREIGN PATENT DOCUMENTS

| EP | 0 866 502 | 9/1998 |
| EP | 1 353 212 A2 | 10/2003 |
| JP | 8-18779 | 1/1996 |
| JP | 2000-92398 | 3/2000 |
| JP | 2001-119010 | 4/2001 |
| JP | 2003-198954 | 7/2003 |

* cited by examiner

*Primary Examiner* — Karen Tang
(74) *Attorney, Agent, or Firm* — Drinker Biddle & Reath LLP

(57) ABSTRACT

An image pickup device 1A is constructed with a photodetecting section 10 having a plurality of pixels; a charge transfer section 12 having 16 segmental charge transfer sections T01 to T16; an A/D converting section 15 that converts signals from the charge transfer section 12 to digital data signals; and a digital signal processing section 20. The digital signal processing section 20 carries out, to a correction target of a data signal outputted first in a signal array from the segmental charge transfer section, a data correction by use of a plurality of correcting data signals including at least one of a first correcting data signal included in the signal array and a second correcting data signal included in another signal array from a segmental charge transfer section adjacent to an output end side of the segmental charge transfer section. Thereby, realized are an image pickup device that is capable of favorably reducing influence of an abnormal output produced in data signals and a microscope apparatus using the same.

5 Claims, 12 Drawing Sheets

Fig.3

| | | | | |
|---|---|---|---|---|
| 01-1 01-2 | T01 | ----- | 01-n | 01-1=01-2 |
| 02-1 02-2 | T02 | ----- | 02-n | 02-1 = $\frac{01\text{-}n + 02\text{-}2}{2}$ |
| 03-1 03-2 | T03 | ----- | 03-n | 03-1 = $\frac{02\text{-}n + 03\text{-}2}{2}$ |
| 04-1 04-2 | T04 | ----- | 04-n | 04-1 = $\frac{03\text{-}n + 04\text{-}2}{2}$ |
| 05-1 05-2 | T05 | ----- | 05-n | 05-1 = $\frac{04\text{-}n + 05\text{-}2}{2}$ |
| 06-1 06-2 | T06 | ----- | 06-n | |
| 07-1 07-2 | T07 | ----- | 07-n | |
| 08-1 08-2 | T08 | ----- | 08-n | |
| 09-1 09-2 | T09 | ----- | 09-n | |
| 10-1 10-2 | T10 | ----- | 10-n | |
| 11-1 11-2 | T11 | ----- | 11-n | |
| 12-1 12-2 | T12 | ----- | 12-n | |
| 13-1 13-2 | T13 | ----- | 13-n | |
| 14-1 14-2 | T14 | ----- | 14-n | |
| 15-1 15-2 | T15 | ----- | 15-n | |
| 16-1 16-2 | T16 | ----- | 16-n | 16-1 = $\frac{15\text{-}n + 16\text{-}2}{2}$ |

Fig.12

| 01-1 | 01-2 | ---- | T01 | ---- | 01-n |
|---|---|---|---|---|---|
| 02-1 | 02-2 | ---- | T02 | ---- | 02-n |
| 03-1 | 03-2 | ---- | T03 | ---- | 03-n |
| 04-1 | 04-2 | ---- | T04 | ---- | 04-n |
| 05-1 | 05-2 | ---- | T05 | ---- | 05-n |
| 06-1 | 06-2 | ---- | T06 | ---- | 06-n |
| 07-1 | 07-2 | ---- | T07 | ---- | 07-n |
| 08-1 | 08-2 | ---- | T08 | ---- | 08-n |
| 09-1 | 09-2 | ---- | T09 | ---- | 09-n |
| 10-1 | 10-2 | ---- | T10 | ---- | 10-n |
| 11-1 | 11-2 | ---- | T11 | ---- | 11-n |
| 12-1 | 12-2 | ---- | T12 | ---- | 12-n |
| 13-1 | 13-2 | ---- | T13 | ---- | 13-n |
| 14-1 | 14-2 | ---- | T14 | ---- | 14-n |
| 15-1 | 15-2 | ---- | T15 | ---- | 15-n |
| 16-1 | 16-2 | ---- | T16 | ---- | 16-n |

DSP

IMAGING APPARATUS AND MICROSCOPE APPARATUS USING THE SAME

TECHNICAL FIELD

The present invention relates to an image pickup device such as a CCD image sensor, and a microscope apparatus using the same.

BACKGROUND ART

A CCD image sensor being an image pickup device that acquires a one-dimensional or two-dimensional image is constructed with a photodetecting section for which a plurality of pixels are arranged in an array form and a horizontal shift register inputted, in parallel, with electric charges from a plurality of vertical shift registers composing the photodetecting section. In such a configuration, electric charges generated in the respective pixels of the photodetecting section are transferred in the vertical direction by the vertical shift registers and are inputted to corresponding cells of the horizontal shift register. The horizontal shift register transfers the electric charges inputted from the vertical shift registers in the horizontal direction to be an output direction, and the electric charges are read out from an output end thereof.

Moreover, in order to speed up reading out of the electric charges generated in the photodetecting section, employed is a multi-tap structure for which the horizontal shift register is divided into a plurality of segmental shift registers and electric charge output ends are provided for the respective segmental shift registers. Such a configuration providing a plurality of output ends is useful particularly in such a case that the number of pixels in the photodetecting section is increased and a long time is required for reading out electric charges from all pixels with an ordinal configuration (see Patent Documents 1 and 2, for example).

Patent Document 1: Japanese Patent Application Laid-Open No. 2001-119010
Patent Document 2: Japanese Patent Application Laid-Open No. 2003-198954
Patent Document 3: Japanese Patent Application Laid-Open No. H08-18779

DISCLOSURE OF THE INVENTION

Problems to be Solved by the Invention

In the above-described image pickup device having a multi-tap structure, an abnormal output such as a drop in output may occur in data signals (initial data of each tap) outputted first from the respective output ends. Such an abnormal output constitutes a factor of deterioration in quality of image data as a whole obtained by adding up signal arrays of data signals respectively outputted from the plurality of output ends.

As a method for reducing such influence of an abnormal output of data signals, there is a method for carrying out, after acquiring image data composed of data signals outputted from an image pickup device, data correction by means of software in a computer or the like loaded with the image data. However, in such a method, since a correction processing is carried out after image data is outputted from the image pickup device, there is a problem such that it takes time to acquire final image data applied with a data correction.

The present invention has been made to solve the above problems, and an object thereof is to provide an image pickup device that is capable of favorably reducing influence of an abnormal output produced in data signals and a microscope apparatus using the same.

Means for Solving the Problems

In order to achieve this object, an image pickup device according to the present invention includes: (1) photodetecting means that has a plurality of pixels arranged in an array form and outputs an electric charge generated according to an incident light amount in the pixel; (2) charge transfer means provided for the photodetecting means along one of the arrangement directions of the plurality of pixels and having N (N is an integer equal to or more than 2) segmental charge transfer sections divided in terms of the arrangement direction; (3) A/D converting means that converts signals by electric charges outputted from the photodetecting means via the charge transfer means to digital data signals; and (4) digital signal processing means that carries out a signal processing for the data signals outputted from the A/D converting means, and (5) the segmental charge transfer section transfers electric charges from pixels present in a predetermined photodetecting region of the photodetecting means in an output direction and outputs from an output end, and the digital signal processing means carries out, to a correction target of a data signal outputted first in a signal array from the segmental charge transfer section, a data correction by use of a plurality of correcting data signals including at least one of a first correcting data signal and a second correcting data signal while setting another predetermined data signal included in the signal array as the first correcting data signal, and a predetermined data signal included in another signal array from a segmental charge transfer section adjacent to an output end side of the segmental charge transfer section as the second correcting data signal.

In the above-described image pickup device, employed is a multi-tap structure for which the charge transfer means inputted, in parallel, with electric charges from the plurality of pixels of the photodetecting means or a plurality of vertical shift registers composing the photodetecting means is divided into the plurality of segmental charge transfer sections each having an output end. This speeds up reading out of electric charges generated in the respective pixels of the photodetecting means.

Moreover, in such a multi-tap structure, in response to an abnormal output that occurs in the initial data signals outputted from the respective output ends of the plurality of segmental charge transfer sections, the digital signal processing means using a digital signal processor (DSP) is provided and a data correction for the abnormal output of data signals is carried out in the digital signal processing means. This makes it possible to easily and speedily acquire final image data applied with a data correction. In addition, by using a plurality of correcting data signals including at least one of the first correcting data signal and the second correcting data signal described above, influence of an abnormal output produced in data signals can be favorably reduced so as to obtain image data with a satisfactory quality.

A microscope apparatus according to the present invention includes: the image pickup device described above for acquiring an image by an optical image of a sample to be an observation target; a light guiding optical system that includes an objective lens into which light from the sample is made incident and which guides the optical image of the sample to the image pickup device; and image acquisition control means that controls acquisition of the image of the sample by the image pickup device.

In the microscope apparatus described above, a microscope apparatus is constructed with use of the image pickup device described above that carries out, with regard to initial data signals outputted from the respective output ends of the plurality of segmental charge transfer sections, a data correction in response to an abnormal output of data signals in the digital signal processing means. Thereby, it becomes possible to acquire image data with a satisfactory quality in an observation of the sample.

Effects of the Invention

According to an imaging device and a microscope apparatus using the same of the present invention, by employing a multi-tap structure for which the charge transfer means is divided into a plurality of segmental charge transfer sections and carrying out, with regard to data signals outputted first in signal arrays from the respective output ends of the plurality of segmental charge transfer sections, a data correction in response to an abnormal output by a predetermined correcting method in the digital signal processing means, it becomes possible to favorably reduce influence of an abnormal output produced in data signals.

BRIEF DESCRIPTION OF THE DRAWINGS

FIG. 3 is a view showing data signals outputted from output FIFOs of first to fourth DSPs.

FIG. 12 is a view showing data signals inputted to a memory via an EMIF of a DSP.

DESCRIPTION OF THE SYMBOLS 1A, 1B, 1C—image pickup device, 10—photodetecting section, R01 to R16—photodetecting region, 11—accumulating section, 12—charge transfer section, T01 to T16—segmental charge transfer section, 13—accumulating section, 14—charge transfer section, T17 to T32—segmental charge transfer section, 15—A/D converting section, C01 to C16—A/D converter, 16a to 16c—data selector circuit (DS circuit), 17—RAM, 18—buffer, 19—control section, 20—digital signal processing section, 21 to 29—digital signal processor (DSP), 3—microscope apparatus, 30—sample stage, 35—XY stage driving section, 40—light guiding optical system, 41—objective lens, 45—optical system driving section, 50—control device, 51—input device, 52—display device.

BEST MODES FOR CARRYING OUT THE INVENTION

Hereinafter, preferred embodiments of an image pickup device and a microscope apparatus using the same according to the present invention will be described in detail along with the accompanying drawings. Here, in the description of the drawings, identical elements are designated with identical numerical symbols so as to avoid overlapping descriptions. Dimensional ratios of the drawings are not always coincident with those in the description.

Figure 1:
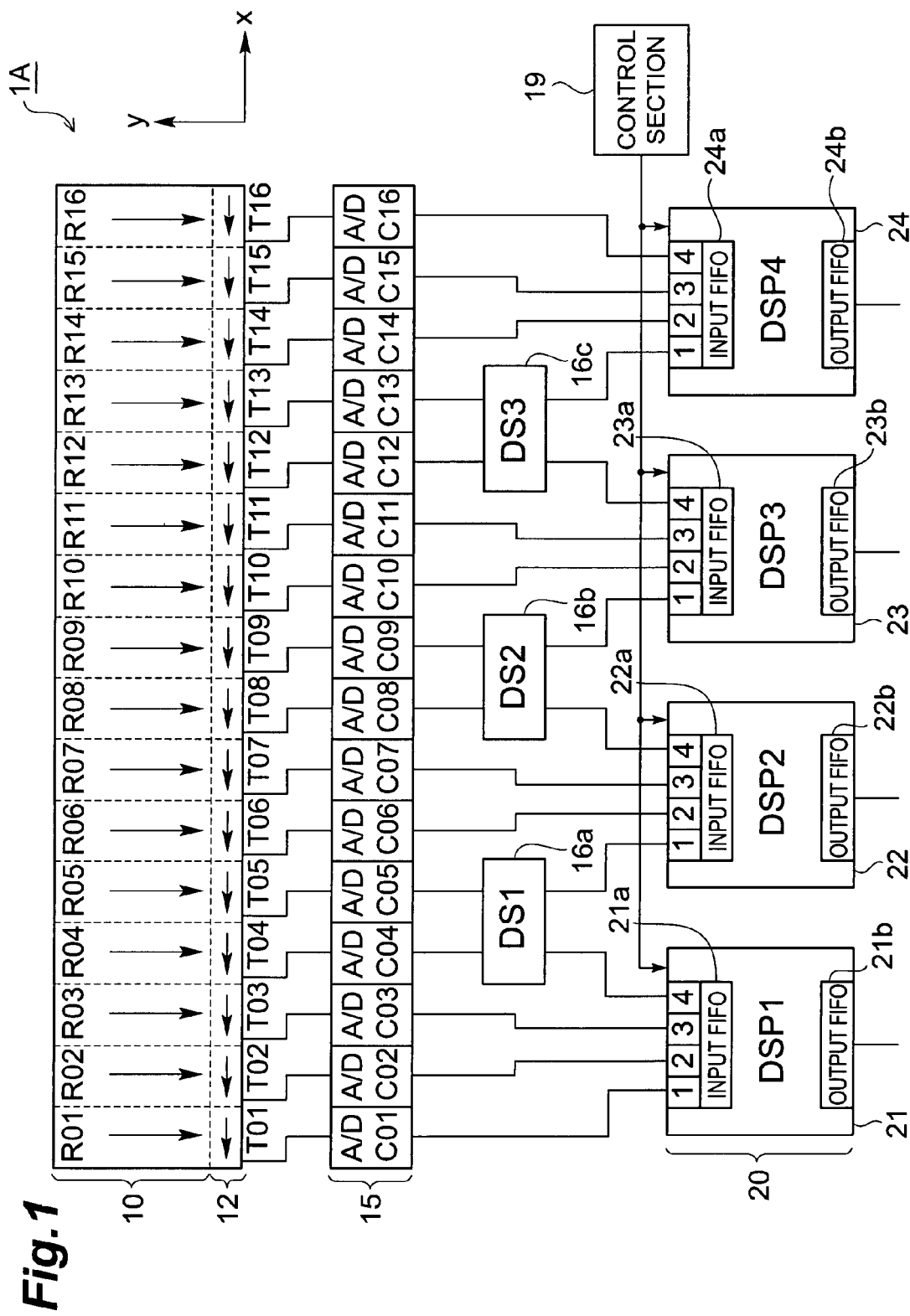
FIG. 1 is a block diagram showing a configuration of a first embodiment of an image pickup device.

FIG. 1 is a block diagram showing a configuration of a first embodiment of an image pickup device according to the present invention. An image pickup device 1A of the present embodiment includes a photodetecting section 10, a charge transfer section 12, an A/D converting section 15, and a digital signal processing section 20.

The photodetecting section 10 is photodetecting means that has a plurality of pixels arranged in a two-dimensional array form and each having a photoelectric conversion function and outputs an electric charge generated according to the incident light amount in the pixel. Hereinafter, for convenience of description, of the arrangement directions of the pixels in the photodetecting section 10, the direction from left to right is set as an x-axis direction, and the direction from bottom to top is set as a y-axis direction. Moreover, the plurality of two-dimensional array formed pixels in the photodetecting section 10 compose a plurality of vertical shift registers whose charge transfer direction is in a vertical direction (negative y-axis direction in FIG. 1).

For the photodetecting section 10, under the same in the figure, a charge transfer section 12 is provided along the x-axis direction being one arrangement direction of the plurality of pixels. The charge transfer section 12 is a horizontal shift register that transfers electric charges outputted from the plurality of vertical shift registers composing the photodetecting section 10 and inputted in parallel in a predetermined output direction (horizontal direction, negative x-axis direction in FIG. 1) and outputs the same from an output end.

In the present embodiment, the charge transfer section 12 is divided into a plurality of segments in the x-axis direction to have 16 segmental charge transfer sections T01 to T16. The segmental charge transfer sections T01 to T16 are each constructed with a plurality of and an equal number of cells, and are disposed in order from the left side to the right side in the figure. In addition, the charge transfer direction in each of the segmental charge transfer sections T01 to T16 is a negative x-axis direction as described above, and a left end side thereof is an electric charge output end.

Moreover, for the segmental charge transfer sections T01 to T16 of the charge transfer section 12, the photodetecting section 10 can be sectioned into corresponding 16 photodetecting regions R01 to R16. In such a configuration, the first segmental charge transfer section T01 of the charge transfer section 12 transfers electric charges outputted by the vertical shift registers from pixels present in the first photodetecting region R01 of the photodetecting section 10 in the output direction and outputs from the output end. At this time, signals outputted from the output end of the segmental charge transfer section T01 are of a signal array for which signals resulting from electric charges inputted in parallel to the plurality of cells of the segmental charge transfer section T01 from the plurality of vertical shift registers in the photodetecting region R01 are outputted in sequence. The second to the sixteenth segmental charge transfer sections T02 to T16 of the charge transfer section 12 and the second to the sixteenth photodetecting regions R02 to R16 of the photodetecting section 10 are also the same in configurations as the first segmental charge transfer section T01 and the first photodetecting region R01, respectively.

Corresponding to these segmental charge transfer sections T01 to T16, 16 A/D converters C01 to C16 are provided in the A/D converting section 15. Analog signals resulting from electric charges from the photodetecting section 10 outputted from the output ends of the segmental charge transfer sections T01 to T16 are converted to digital data signals by corresponding A/D converters of the A/D converters C01 to C16.

The data signals outputted from the A/D converters C01 to C16 are inputted to a digital signal processing section 20 for carrying out a predetermined signal processing to data signals. In the present embodiment, the digital signal processing section 20 is composed of four digital signal processors (DSPs) 21 to 24.

The first DSP 21 is provided for the first to the fourth segmental charge transfer sections T01 to T04, and is inputted with data signals from the A/D converters C01 to C04. The second DSP 22 is provided for the fifth to the eighth segmental charge transfer sections T05 to T08, and is inputted with data signals from the A/D converters C05 to C08. The third DSP 23 is provided for the ninth to the twelfth segmental charge transfer sections T09 to T12, and is inputted with data signals from the A/D converters C09 to C12. The fourth DSP 24 is provided for the thirteenth to the sixteenth segmental charge transfer sections T13 to T16, and is inputted with data signals from the A/D converters C13 to C16. In addition, signal processing operations in these DSPs 21 to 24 are controlled by a control section 19 including a CPU.

Moreover, in FIG. 1, three data selector (DS) circuits 16a to 16c are provided between the A/D converting section 15 and the digital signal processing section 20. The first DS circuit 16a is installed between the A/D converters C04 and C05 and the first and second DSPs 21 and 22. The second DS circuit 16b is installed between the A/D converters C08 and C09 and the second and third DSPs 22 and 23. The third DS circuit 16c is installed between the A/D converters C12 and C13 and the third and fourth DSPs 23 and 24.

To first to fourth ports of an input FIFO 21a of the first DSP 21, data signals from the A/D converters C01, C02, and C03 and the DS circuit 16a are inputted, respectively. To first to fourth ports of an input FIFO 22a of the second DSP 22, data signals from the DS circuit 16a, the A/D converters C06 and C07, and the DS circuit 16b are inputted, respectively.

To first to fourth ports of an input FIFO 23a of the third DSP 23, data signals from the DS circuit 16b, the A/D converters C10 and C11, and the DS circuit 16c are inputted, respectively. To first to fourth ports of an input FIFO 24a of the fourth DSP 24, data signals from the DS circuit 16c, the A/D converters C14, C15, and C16 are inputted, respectively.

Here, each of the DS circuits 16a to 16c sends out the data signal inputted from the segmental charge transfer section via the A/D converter to a corresponding DSP. In addition, as will be described later, each holds a predetermined data signal and sends out the held data signal to another DSP as a correcting data signal for a data correction to be executed in the DSP.

The DSPs 21 to 24 each carry out a necessary signal processing such as a data correction to data signals inputted from corresponding A/D converters C01 to C16 and DS circuits 16a to 16c. Then, the data signals after a signal processing are outputted as final image data acquired in the present image pickup device 1A from output FIFOs 21b to 24b of the DSPs 21 to 24.

Next, description will be given of a data correction executed to image data in the image pickup device 1A having a configuration shown in FIG. 1.

Figure 2:
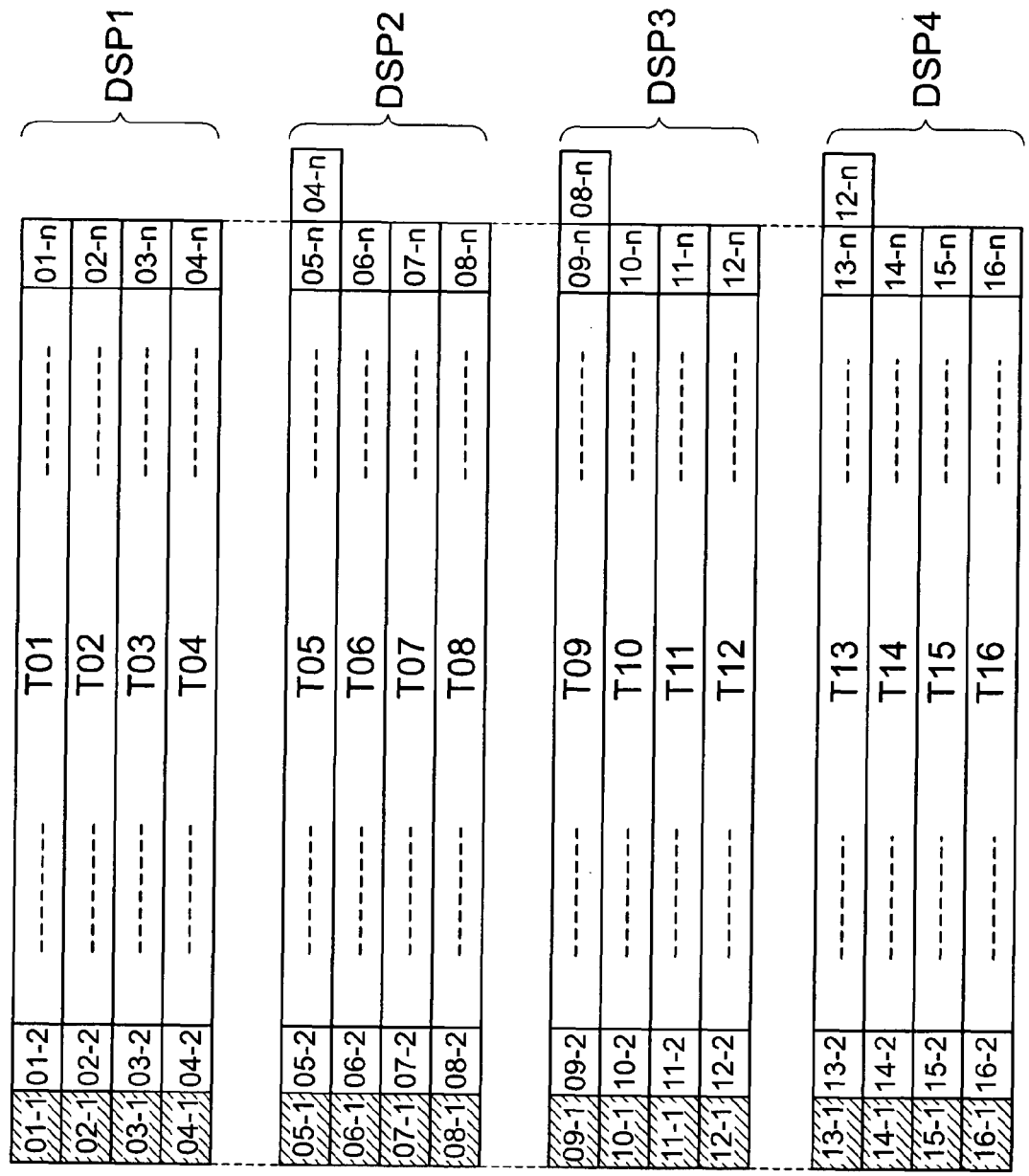
FIG. 2 is a view showing data signals inputted to input FIFOs of first to fourth DSPs.

FIG. 2 is a view showing an example of data signals inputted to the input FIFOs 21a to 24a of the first to the fourth DSPs 21 to 24. Hereinafter, the number of cells in each of the segmental charge transfer sections T01 to T16 is provided as n (n is an integer equal to or more than 2). In addition, with regard to a signal array of n data signals outputted from the segmental charge transfer section T01, a data signal outputted first is denoted as 01-1, and a data signal outputted second, as 01-2, . . . , and a data signal outputted last, as 01-n. The same applies to signal arrays outputted from other segmental charge transfer sections T02 to T16.

Here, the number n of data signals outputted from the segmental charge transfer section is equivalent to the number of vertical shift registers in the corresponding photodetecting region of the photodetecting section 10. For example, the data signal 01-1 outputted first from the segmental charge transfer section T01 corresponds to an electric charge outputted from the leftmost vertical shift register of the photodetecting region R01. In addition, the data signal 01-n outputted last corresponds to an electric charge outputted from the rightmost vertical shift register. In addition, the signal arrays outputted from the segmental charge transfer sections T01 to T16 are inputted to the DSPs 21 to 24 as digital data signals, via the corresponding A/D converters C01 to C16 as described above.

In the present embodiment, to the second DSP 22, in addition to the signal arrays from the segmental charge transfer sections T05 to T08 to be a processing target, a predetermined data signal included in another signal array from the segmental charge transfer section T04 adjacent to the output end side thereof and being a processing target of the different DSP 21 is inputted as a correcting data signal. Similarly, to the third and fourth DSPs 23 and 24, in addition to the signal arrays from the segmental charge transfer sections T09 to T12 and T13 to T16 to be processing targets, predetermined data signals included in other signal arrays from the segmental charge transfer sections T08 and T12 are inputted as correcting data signals.

Concretely, to the first port of the first DSP 21, a signal array 01-1 to 01-n from the segmental charge transfer section T01 is inputted. In addition, to the second port, a signal array 02-1 to 02-n from the segmental charge transfer section T02 is inputted. In addition, to the third port, a signal array 03-1 to 03-n from the segmental charge transfer section T03 is inputted. In addition, to the fourth port, a signal array 04-1 to 04-n from the segmental charge transfer section T04 is inputted via the DS circuit 16a. Here, in terms of the first DSP 21, no adjacent DSP exists at its output end side. Therefore, no input of correcting data signals being a processing target of a different DSP is carried out.

To the first port of the second DSP 22, a signal array 05-1 to 05-n from the segmental charge transfer section T05 is inputted via the DS circuit 16a, and furthermore, the data signal 04-n outputted last in the signal array from the segmental charge transfer section T04 is inputted as a correcting data signal. In addition, to the second port, a signal array 06-1 to 06-n from the segmental charge transfer section T06 is inputted. In addition, to the third port, a signal array 07-1 to 07-n from the segmental charge transfer section T07 is inputted. In addition, to the fourth port, a signal array 08-1 to 08-n from the segmental charge transfer section T08 is inputted via the DS circuit 16b.

To the first port of the third DSP 23, a signal array 09-1 to 09-n from the segmental charge transfer section T09 is inputted via the DS circuit 16b, and furthermore, the data signal 08-n outputted last in the signal array from the segmental charge transfer section T08 is inputted as a correcting data signal. In addition, to the second port, a signal array 10-1 to 10-$n$ from the segmental charge transfer section T10 is inputted. In addition, to the third port, a signal array 11-1 to 11-$n$ from the segmental charge transfer section T11 is inputted. In addition, to the fourth port, a signal array 12-1 to 12-$n$ from the segmental charge transfer section T12 is inputted via the DS circuit 16c.

To the first port of the fourth DSP 24, a signal array 13-1 to 13-$n$ from the segmental charge transfer section T13 is inputted via the DS circuit 16c, and furthermore, the data signal 12-$n$ outputted last in the signal array from the segmental charge transfer section T12 is inputted as a correcting data signal. In addition, to the second port, a signal array 14-1 to 14-$n$ from the segmental charge transfer section T14 is inputted. In addition, to the third port, a signal array 15-1 to 15-$n$ from the segmental charge transfer section T15 is inputted. In addition, to the fourth port, a signal array 16-1 to 16-$n$ from the segmental charge transfer section T16 is inputted.

Of the data signals from the segmental charge transfer sections T01 to T16 inputted to the DSPs 21 to 24, respectively, in the data signals 01-1 to 16-1 outputted first from the respective segmental charge transfer sections shown with hatching in FIG. 2, an abnormal output such as a drop in output may occur. Such an abnormal output occurs due to a pixel droop caused by a structure of the element itself or an insufficient amplifier frequency band. To cope therewith, in the image pickup device 1A shown in FIG. 1, the DSPs 21 to 24 execute a data correction to a correction target of these initial data signals 01-1 to 16-1.

FIG. 3 is a view showing data signals after signal processing outputted from the output FIFOs 21b to 24b of the first to fourth DSPs 21 to 24. First, in the first DSP 21, with regard to the data signal 01-1 from the segmental charge transfer section T01, since there is no adjacent segmental charge transfer section at the output end side, the data signal 01-2 outputted second in the signal array is used as a correcting data signal. Then, a data correction to replace the correction target data signal 01-1 with the correcting data signal 01-2 (01-1=01-2) is carried out.

Moreover, with regard to the data signal 02-1 from the segmental charge transfer section T02, the data signal 02-2 outputted second in the signal array is used as a first correcting data signal, and the data signal 01-$n$ outputted last in the signal array from the segmental charge transfer section T01 adjacent to the output end side is used as a second correcting data signal. Then, a data correction to replace the correction target data signal 02-1 with an average of the first correcting data signal 02-2 and the second correcting data signal 01-$n$ (02-1=(01-$n$+02-2)/2) is carried out.

A data correction for the data signals 03-1 and 04-1 in the first DSP 21, a data correction for the data signals 05-1 to 08-1 in the second DSP 22, a data correction for the data signals 09-1 to 12-1 in the third DSP 23, and a data correction for the data signals 13-1 to 16-1 in the fourth DSP 24 are also carried out in the same manner as the data correction to the data signal 02-1 in the first DSP 21. By the above data corrections, the data signals shown in FIG. 3 are outputted as final image data acquired in the present image pickup device 1A from the output FIFOs 21b to 24b of the DSPs 21 to 24.

Effects of an image pickup device by the above-described embodiment will be described.

In the image pickup device 1A shown in FIG. 1, employed is a multi-tap structure for which the charge transfer section 12 inputted, in parallel, with electric charges from the plurality of vertical shift registers composing the photodetecting section 10 is divided into the plurality of segmental charge transfer sections T01 to T16 so as to output an electric charge from each output end. This speeds up reading out of electric charges generated by the respective pixels in the photodetecting regions R01 to R16 of the photodetecting section 10.

Moreover, in such a multi-tap structure, in response to an abnormal output that occurs in the initial data signals 01-1 to 16-1 outputted from the output end present at the left end in each of the plurality of segmental charge transfer sections T01 to T16, the digital signal processing section 20 using DSPs is provided and a data correction for the abnormal output of data signals is carried out in DSPs 21 to 24 of the digital signal processing section 20. As such, not by executing a data correction to acquired image data by means of software after this is outputted from an image pickup device, but by executing a data correction in the DSPs 21 to 24 provided in the image pickup device 1A, final image data applied with a data correction can be easily and speedily acquired.

Here, with regard to the configuration of the photodetecting section 10 used for detection of an incident optical image, it is generally sufficient to have a plurality of pixels arranged in an array form. More specifically, if the image pickup device employs a multi-tap structure for which the charge transfer section 12 being a horizontal shift register is divided into a plurality of segmental charge transfer sections (segmental shift registers), with regard to the configuration of the photodetecting section 10, it is possible to apply the above-described data correcting method by DSPs to either sensor of an image sensor for which pixels are arranged in a two-dimensional array form and a line sensor for which pixels are arranged in an one-dimensional array form. In addition, it may be an image sensor that performs a TDI line sensor operation. Moreover, as a charge transferring type in the photodetecting section 10, any of the FT type, FFT type, IT type, and FIT type may be employed.

In addition, with regard to the segmental charge transfer sections in the charge transfer section 12, the charge transfer section is not limited to a structure having the above-described 16 segmental charge transfer sections T01 to T16. Generally, it is sufficient that the charge transfer section is divided into N (N is an integer equal to or more than 2) segmental charge transfer sections in the arrangement direction. In addition, the number of cells in each individual segmental charge transfer section may be set as appropriate.

With regard to a data correcting method for a data signal executed in the digital signal processing section 20, it is preferable to carry out a data correction for a data signal to be a correction target of a DSP outputted first in a signal array from a segmental charge transfer section, while setting another predetermined data signal included in the signal array as a first correcting data signal and a predetermined data signal included in a signal array (another signal array) from a segmental charge transfer section adjacent to the output end side (left side in FIG. 1) of the segmental charge transfer section as a second correcting data signal, by use of the first correcting data signal and the second correcting data signal. By such a data correcting method, influence of an abnormal output produced in data signals can be favorably reduced so as to obtain image data with a satisfactory quality.

In this case, with regard to the first correcting data signal selected in a signal array from a segmental charge transfer section identical with regard to the correction target data signal and the second correcting data signal selected in a signal array from another adjacent segmental charge transfer section, one or a plurality of data signals may be selected according to the concrete data correcting method, respectively. In addition, more generally, a data correction may be carried out by use of a plurality of correcting data signals including at least one of the first correcting data signal and the second correcting data signal. By such a data correcting method as well, influence of an abnormal output produced in data signals can be favorably reduced.

In particular, in the above-described embodiment, as shown in FIG. 2 and FIG. 3, the DSPs 21 to 24 carry out, for the data signals 02-1 to 16-1 excluding 01-1 among correction target data signals, a data correction (for example, 02-1=(01-$n$+02-2)/2) to replace the correction target data signals 02-1 to 16-1, while setting the data signals 02-2 to 16-2 outputted second in the signal arrays as first correcting data signals and the data signals 01-$n$ to 15-$n$ outputted last in other signal arrays as second correcting data signals, by averages of the first and second correcting data signals. By such a data correcting method, correction target data signals can be favorably corrected by a simple correction processing.

Moreover, with regard to the correction target data signal 01-1 outputted from the segmental charge transfer section T01 having no adjacent segmental charge transfer section at the output end side, as described above, it is preferable to carry out a data correction (01-1=01-2) to replace the correction target data signal, while setting the data signal 01-2 outputted second in the signal array as a correcting data signal, by the correcting data signal. Alternatively, a data correction may be carried out while setting a plurality of data signals in the signal array as correcting data signals.

Figure 4:
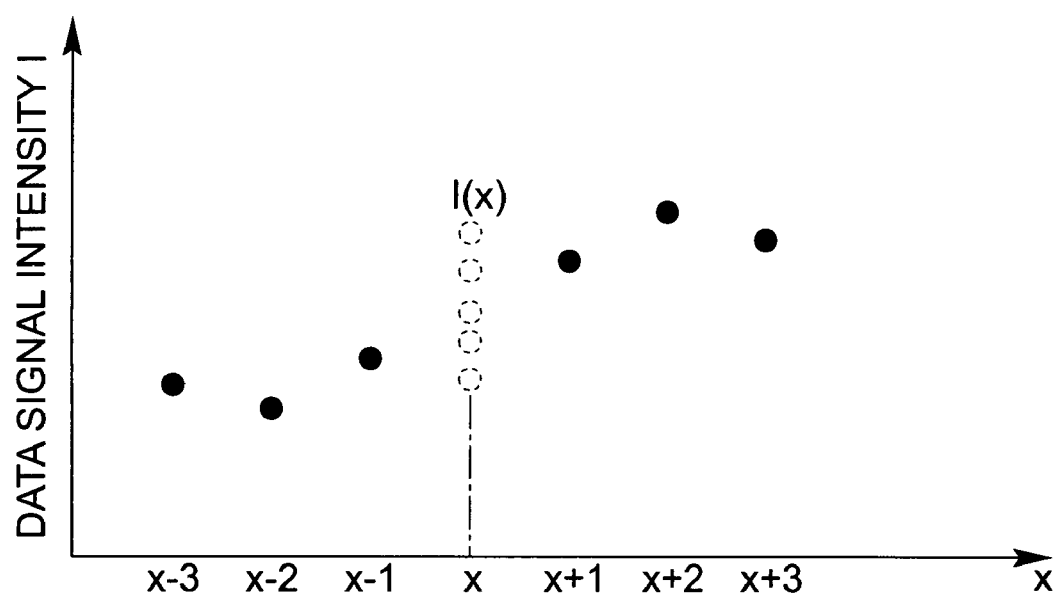
FIG. 4 is a graph showing an example of data signals outputted from a charge transfer section.

With regard to such a concrete data correcting method for a data signal, generally, various methods can be used. FIG. 4 is a graph schematically showing an example of data signals outputted from a charge transfer section. In this graph, the horizontal axis indicates a data signal number (corresponding cell position in the charge transfer section 12) in terms of the x-axis direction, and the vertical axis indicates data signal intensity I(x). For example, where the number of a correction target data signal is x=02-1, x−1 corresponds to a data signal 01-$n$, and x+1, to 02-2.

A correcting method for the data signal I(x) includes the method for using data signals at the last and next one points as first and second correcting data signals and averaging these, as mentioned above with regard to FIG. 3, $$I(x)=\{I(x-1)+I(x+1)\}/2.$$

In addition, as another correcting method, there is a method for using data signals at the last and next two points as first and second correcting data signals and averaging while weighting these with coefficients a and b, $$I(x) = \{(aI(x-2) + bI(x-1)) + (bI(x+1) + aI(x+2))\}/\{2 \times (a+b)\}.$$

The number of respective last and next data points used for a data correction may be set in various ways such as, for example, using data signals at the last and next three points.

Alternatively, a method may be used, such as using a plurality of data signals I(x+1) and I(x+2) included in an identical signal array as with the data signal I(x) being a correction target as correcting data signals, and estimating the data signal I(x) based on a slope thereof for correction by $$I(x) = I(x+1) - \{I(x+2) - I(x+1)\}.$$

With regard to a method for calculating a data signal after correction using a plurality of correcting data signals, various methods may be used, such as, for example, a least squares method, and a spline interpolation method, in addition to the averaging described above.

Moreover, in the digital signal processing section 20, a shading correction (see Patent Document 3, for example) may be carried out in addition to the data correction described above. More specifically, in the image pickup device 1A, nonuniformity in the image due to an uneven sensitivity of the photodetecting section 10 itself, an uneven luminance by an optical system, and the like can occur. In such a case, by carrying out a shading correction for a correction target of all data signals included in the signal array from the charge transfer section 12 including the segmental charge transfer sections T01 to T16, image data obtained in the image pickup device 1A can further be improved in quality.

Figure 5:
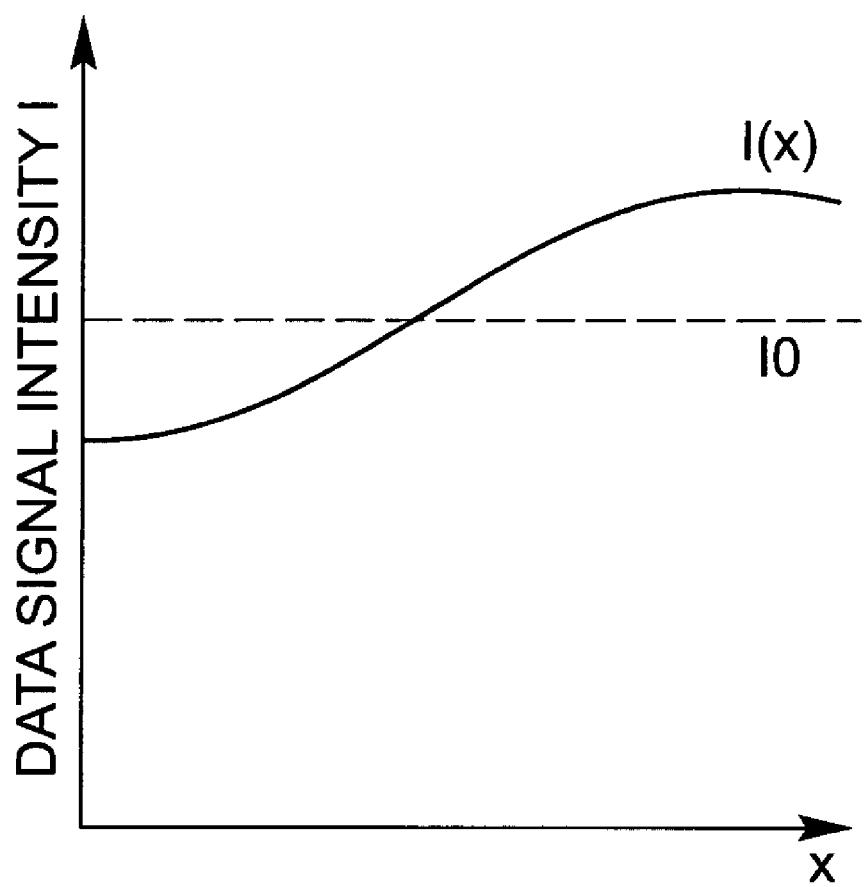
FIG. 5 is a graph showing an example of image data used for a shading correction of data signals.

FIG. 5 is a graph showing an example of image data used for a shading correction of data signals. In the shading correction, light with a uniform incident pattern is made incident into the photodetecting section 10 so as to obtain an intensity distribution of data signal intensity I(x) as shown in FIG. 5. Then, a mean value I0 of the intensity is determined so as to calculate a correction coefficient CC(x) by CC(x)=I0/I(x). An output data signal OUT(x) after the shading correction is determined by OUT(x)=IN(x)×CC(x) based on an input data signal IN(x).

For example, the number of cells in the segmental charge transfer section is 256, 256 correction coefficients CC(0) to CC(255) are prepared for one segmental charge transfer section in the DSP of the digital signal processing section 20. At this time, when one correction coefficient is 16 bits, the data amount is 16 bits×256=512 Bytes. Here, an example where a shading correction is carried out in only the x-axis direction for electric charges from the photodetecting section 10 has been shown, however, a two-dimensional shading correction may be carried out in the x-axis direction and y-axis direction. In this case, correction coefficients are expressed by a two-dimensional matrix of coefficients CC (x, y).

With regard to the configuration of the digital signal processing section 20 that carries out a signal processing such as a data correction for data signals outputted from the charge transfer section 12, in the image pickup device 1A shown in FIG. 1, the four DSPs 21 to 24 corresponding to four segmental charge transfer sections, respectively, are used to compose the digital signal processing section 20. By executing a data correction by use of a plurality of DSPs as such, the time required for a data correction in the image pickup device 1A can be shortened. In this case, it is generally sufficient that the digital signal processing section is constructed with M (M is an integer equal to or more than 2) DSPs to each of which signal arrays from one or a plurality of segmental charge transfer sections are inputted.

Moreover, in the configuration using a plurality of DSPs as such, as mentioned above with regard to the second to the fourth DSPs 22 to 24 in FIG. 2, it is preferable to input, to a DSP, in addition to the signal arrays from the segmental charge transfer sections to be a processing target, a predetermined data signal included in another signal array from the segmental charge transfer section adjacent to the output end side thereof and being a processing target of a different DSP as a second correcting data signal. Consequently, even when a plurality of DSPs are used for a data correction of data signals outputted from the charge transfer section 12, it becomes possible, in each thereof, to favorably execute a data correction in response to an abnormal output of data signals.

A concrete configuration example of the image pickup device 1A shown in FIG. 1 will be described.

Figure 6:
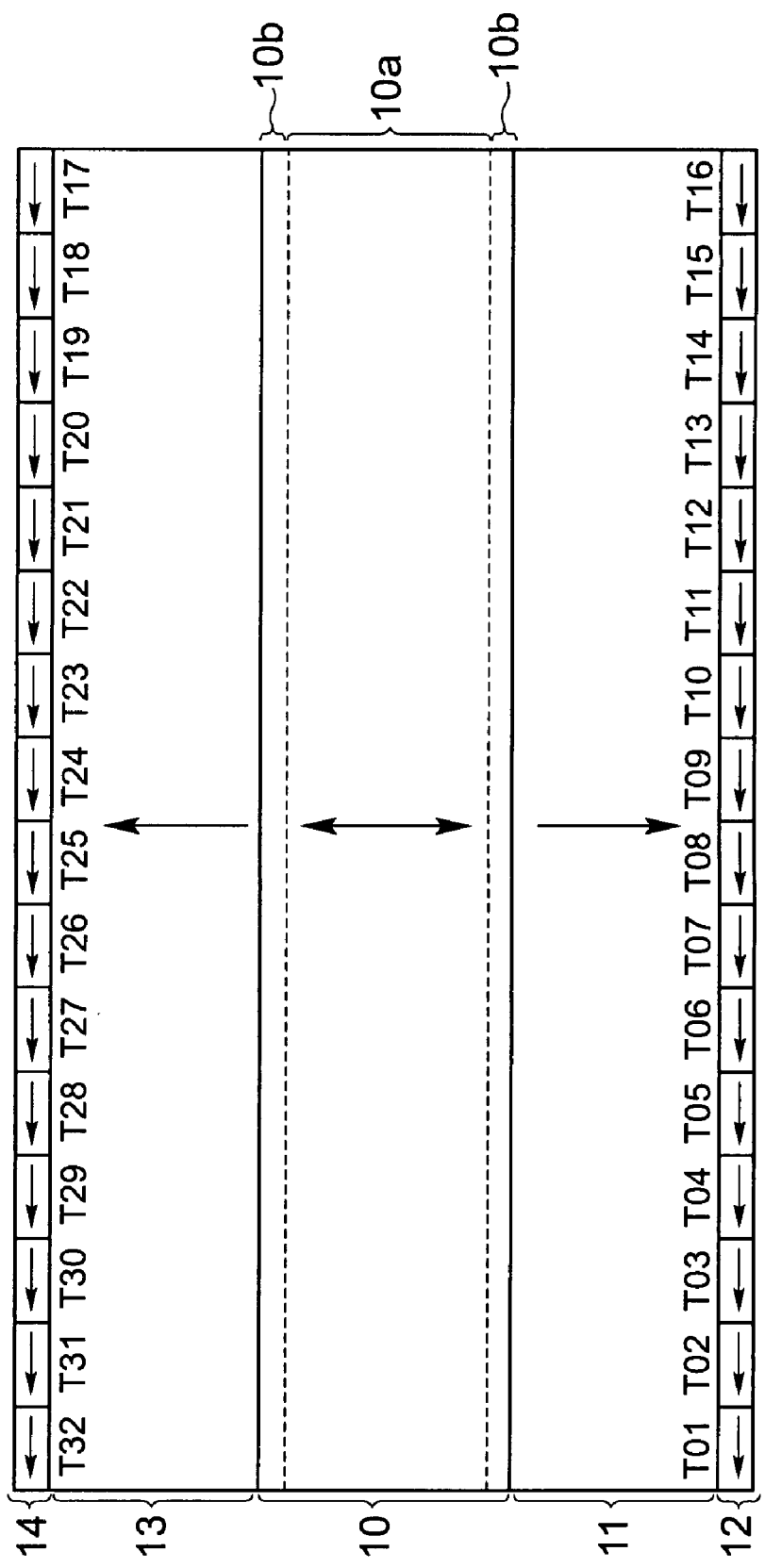
FIG. 6 is a plan view showing an example of a configuration of a photodetecting section and a charge transfer section.

FIG. 6 is a plan view showing an example of a configuration of a photodetecting section and a charge transfer section used for the image pickup device shown in FIG. 1. In the configuration example, the photodetecting section 10 is composed of a two-dimensional array formed 4096×70 pixels, with 4096 cells in the horizontal direction (x-axis direction) and 70 lines in the vertical direction (y-axis direction). Moreover, in the vertical direction, three upper and lower respective lines are provided as dummy regions 10b, and inner 64 lines are provided as a region 10a used for photodetection.

In response to the photodetecting section 10, the charge transfer section 12 is composed of the 16 segmental charge transfer sections T01 to T16 each having 256 cells. Moreover, at the output end side of the individual segmental charge transfer section, dummy cells are provided as necessary. Such a configuration includes, for example, a configuration for which 4 dummy cells are connected at the output end side in addition to the above-described 256 active cells, and a total of 260 cells are provided as a segmental charge transfer section. Moreover, in the present configuration example, an accumulating section 11 with, similar to the photodetecting section 10, 4096 cells and 70 lines is provided between the photodetecting section 10 and charge transfer section 12.

Furthermore, in the configuration of FIG. 6, above the photodetecting section 10, provided are an accumulating section 13, and a charge transfer section 14 having segmental charge transfer sections T17 to T32, which are the same in configuration as the accumulating section 11 and charge transfer section 12 provided thereunder, are provided. Thereby, in the present configuration, the charge transfer direction of the vertical shift registers of the photodetecting section 10 can be set to either of the two upper and lower directions.

Figure 7:
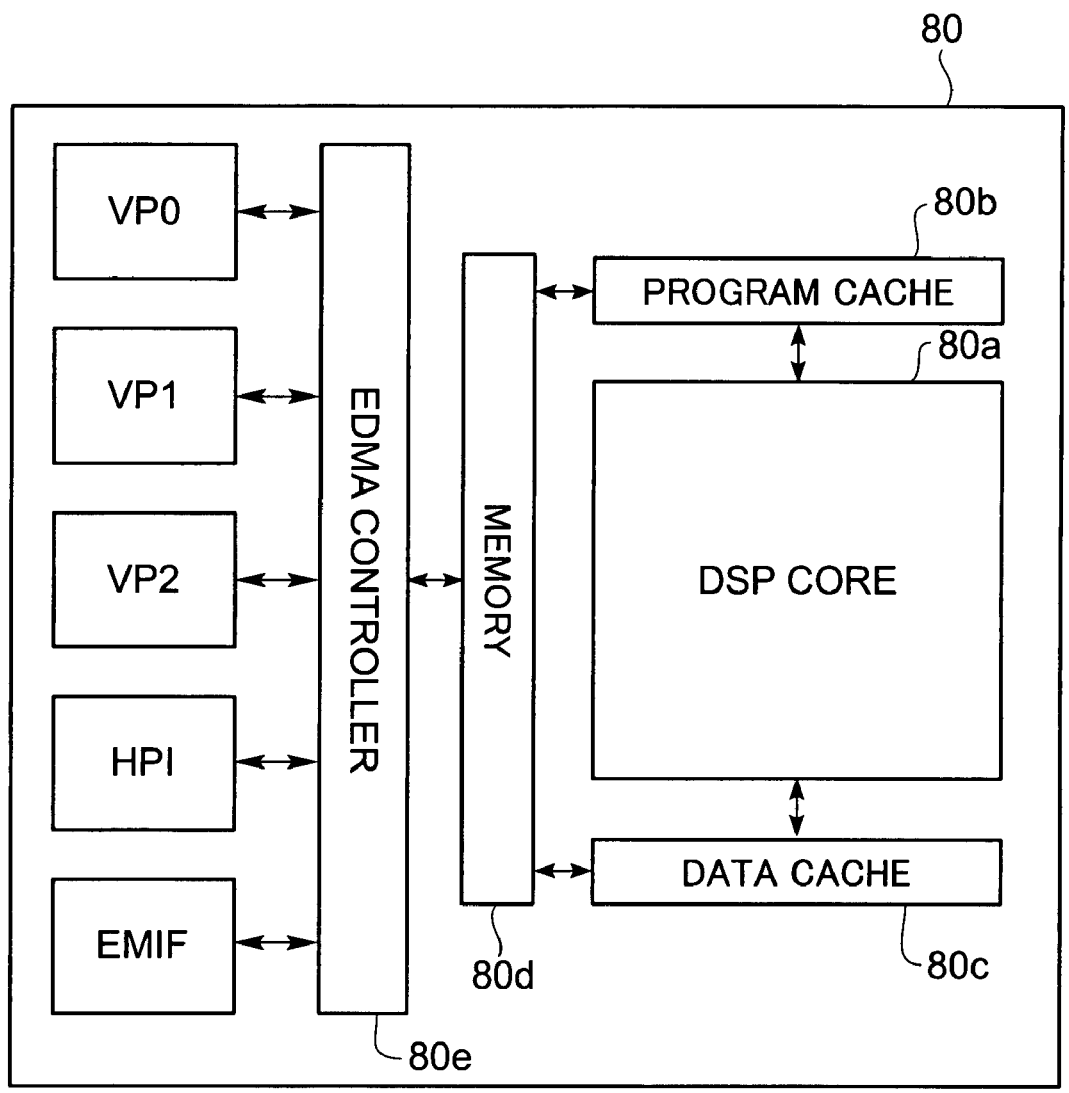
FIG. 7 is a block diagram showing an example of a configuration of a digital signal processor (DSP).

FIG. 7 is a block diagram showing an example of a configuration of a digital signal processor (DSP) used for the image pickup device shown in FIG. 1. This DSP 80 has a DSP core 80a for executing a signal processing such as a data correction, a program cache 80b, a data cache 80c, a memory 80d, and an EDMA (Enhanced Direct Memory Access) controller 80e. In addition, to the EDMA controller 80e, a VP (Video Port) 0, a VP1, a VP2, an HPI (Host Port InterFace), and an EMIF (External Memory InterFace) are connected.

Of these, the VP0 to VP2 video ports are used as an input FIFO and an output FIFO in the DSPs 21 to 24 of the digital signal processing section 20 shown in FIG. 1. As such a configuration, for example, a configuration using the VP0 and VP1 as an input FIFO and using the VP2 as an output FIFO can be employed.

Next, description will be given of a microscope apparatus according to the present invention using the image pickup device shown in FIG. 1.

Figure 8:
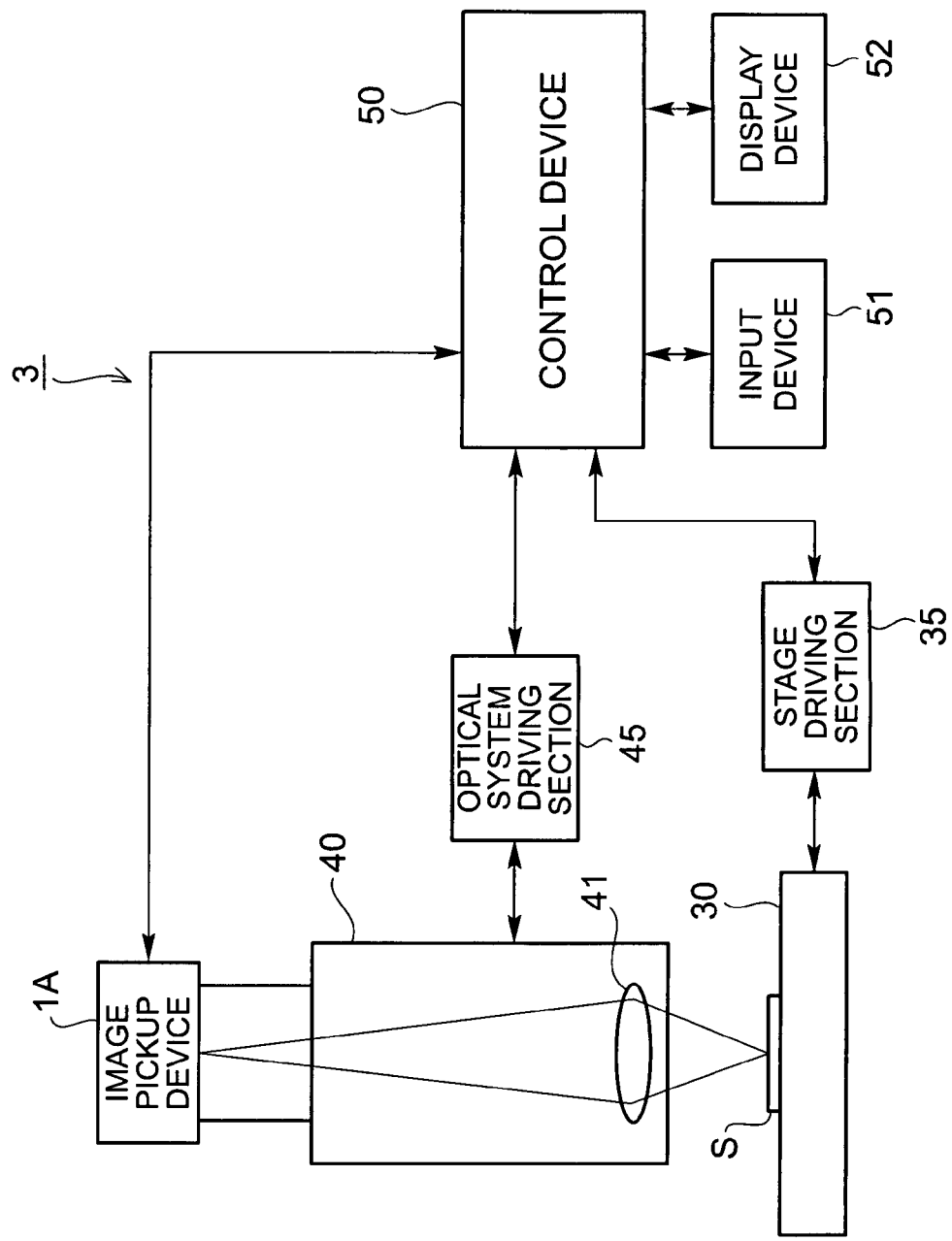
FIG. 8 is a block diagram showing a configuration of an embodiment of a microscope apparatus.

FIG. 8 is a block diagram showing a configuration of an embodiment of a microscope apparatus according to the present invention. This microscope apparatus 3 is used for acquiring a one-dimensional or two-dimensional image of a sample S. Here, the direction to be an optical axis direction of the microscope device 3 is provided as a z-axis direction, and the directions perpendicular to the optical axis and to be the arrangement directions of the pixels in the photodetecting section of the image pickup device 1A are set as an x-axis direction and a y-axis direction (see FIG. 1). In addition, the sample S to be an observation target of the present microscope apparatus 3 is, for example, a biological sample, which is placed on a sample stage 30.

The sample stage 30 is formed of an XY stage movable in the x-direction and y-direction (horizontal direction), and by driving this XY stage 30 in an xy plane, an observation position in the microscope apparatus 3 for the sample S is set or changed in terms of the direction perpendicular to the optical axis. In addition, the sample stage 30 is drive-controlled by an XY stage driving section 35.

For the sample S on the sample stage 30, a light guiding optical system 40 for guiding an optical image of the sample S is provided above the stage 30. This light guiding optical system 40 includes an objective lens 41 into which light from the sample S is made incident and optical components necessary for guiding and converging the optical image of the sample S. Moreover, at a predetermined position on an optical path along which the optical image of the sample S is guided by the light guiding optical system 40, the image pickup device 1A having the configuration shown in FIG. 1 is installed. The image pickup device 1A is image pickup means that acquires an image by the optical image of the sample S. In addition, the light guiding optical system 40 and the image pickup device 1A are integrally fixed with their optical axes, a distance between the optical system 40 and the image pickup device 1A, and the like having been adjusted.

Moreover, for the light guiding optical system 40 and the image pickup device 1A, an optical system driving section 45 is installed. The optical system driving section 45 is constructed with use of, for example, a stepping motor or a piezo actuator, and shifts the optical system 40 and the image pickup device 1A fixed to the optical system 40 in the z-axis direction being the optical axis direction. In this configuration, the optical system driving section 45 has a function to adjust or change a focal position on the sample S for the image pickup device 1A and the light guiding optical system 40 in terms of the optical axis direction. This optical system driving section 45 is used for controlling a focal point in acquisition of an image of the sample S.

For the sample stage 30, the light guiding optical system 40, and the image pickup device 1A, a control device 50 is installed. The control device 50 is image acquisition control means that controls acquisition of an image of the sample S by the image pickup device 1A. Moreover, it is preferable that the control device 50 has a focal point controlling function to carry out acquisition of focus information including an in-focus position concerning acquisition of the image of the sample S, control of a focal point at the time of acquiring the image of the sample S, and the like.

The control device 50 is composed of, for example, a computer including a CPU and necessary storage such as a memory and a hard disk. Moreover, to the control device 50, an input device 51 and a display device 52 are connected. The input device 51 is composed of, for example, a keyboard, a mouse, and the like connected to a computer and is used for input and the like of information and instructions necessary for executing a sample S image acquiring operation in the present microscope apparatus 3. Moreover, the display device 52 is composed of, for example, a CRT display, a liquid crystal display, or the like connected to a computer and is used for displaying necessary information and the like with regard to acquisition of the image in the present microscope apparatus 3.

In the microscope apparatus 3 shown in FIG. 8, the microscope apparatus 3 is constructed with use of the image pickup device 1A shown in FIG. 1 that carries out a data correction for an abnormal output of data signals in the digital signal processing section 20 with regard to data signals outputted first in signal arrays from the respective output ends of the plurality of segmental charge transfer sections T01 to T16. Thereby, it becomes possible to acquire image data with a satisfactory quality in an observation of the sample S.

The configuration of an image pickup device according to the present invention will further be described.

Figure 9:
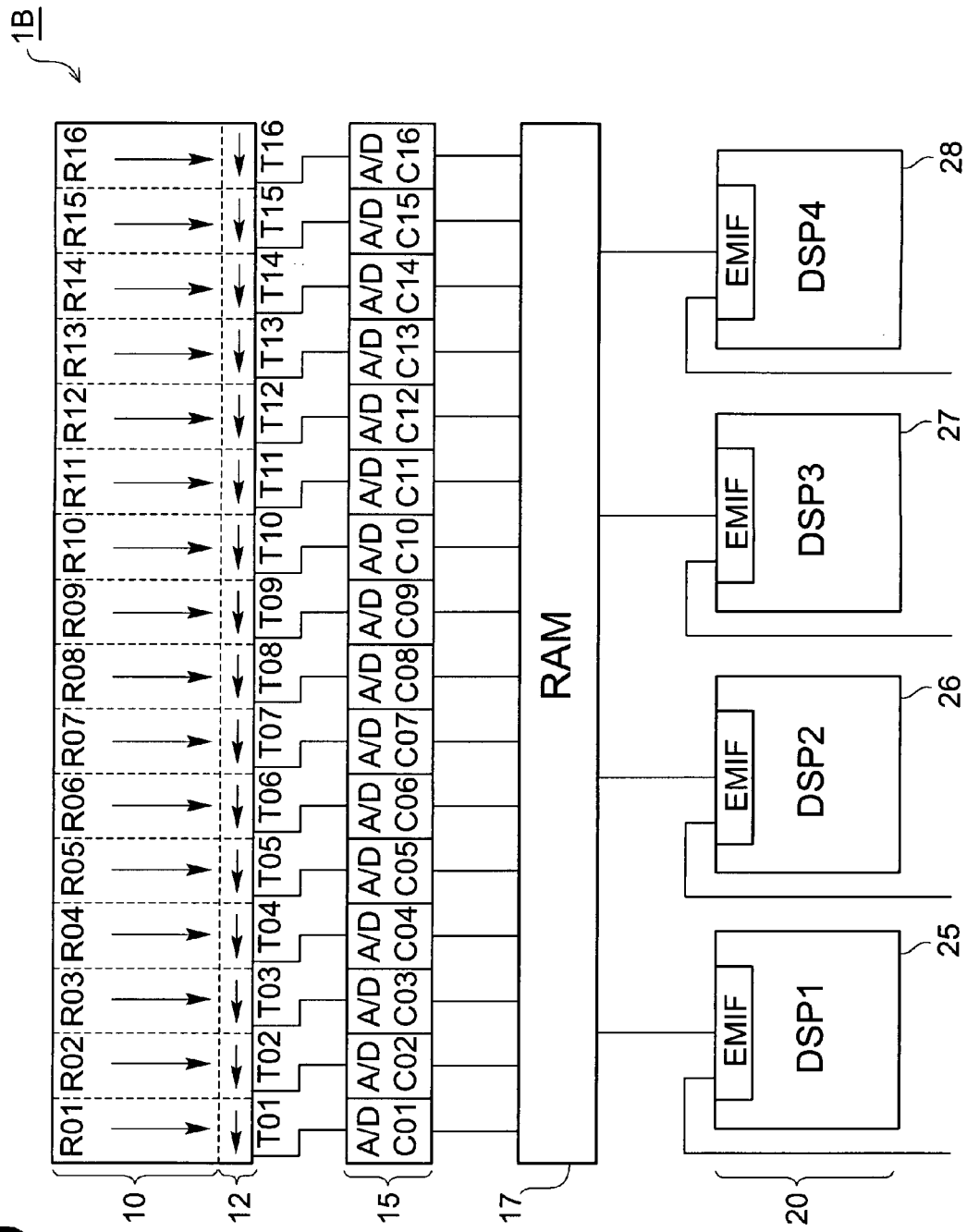
FIG. 9 is a block diagram showing a configuration of a second embodiment of an image pickup device.

FIG. 9 is a block diagram showing a configuration of a second embodiment of an image pickup device according to the present invention. An image pickup device 1B of the present embodiment includes a photodetecting section 10, a charge transfer section 12, an A/D converting section 15, and a digital signal processing section 20. Of these, the configurations of the photodetecting section 10, the charge transfer section 12, and the A/D converting section 15 are the same as those in the first embodiment. In addition, the data correcting method and the like in a signal processing carried out by the digital signal processing section 20 is also as mentioned above in terms of the first embodiment.

Data signals outputted from the A/D converters C01 to C16 are inputted to the digital signal processing section 20 for carrying out a predetermined signal processing for data signals. In the present embodiment, the digital signal processing section 20 is composed of four DSPs 25 to 28. Moreover, in FIG. 9, a RAM 17 is provided between the A/D converting section 15 and the digital signal processing section 20. This RAM 17 is data storing means for temporarily storing data signals outputted from the A/D converting section 15. Data signals from the A/D converting section 15 are once taken into the RAM Then, necessary data signals are inputted to the corresponding DSPs 25 to 28, respectively, in sequence. In the present embodiment, input of data to the memory 80$d$ in the DSPs 25 to 28 and output of data from the memory 80$d$ are carried out via an EMIF in each DSP (see FIG. 7).

As such, in the configuration where data storing means such as a RAM 17 is provided between the A/D converting section 15 and the digital signal processing section 20, according to the concrete configuration of the digital signal processing section 20 and the concrete data correcting method for a data signal, necessary data signals can be favorably inputted from the A/D converting section 15 to each of the DSPs 25 to 28 composing the digital signal processing section 20. In particular, such a configuration has an advantage that the degree of freedom of an input configuration of data signals to the DSPs of the digital signal processing section 20 is high. For example, for the image pickup device 1B having the configuration shown in FIG. 9, it is possible to employ various input configurations other than the input configuration of data signals shown in FIG. 2 with regard to FIG. 1.

Figure 10:
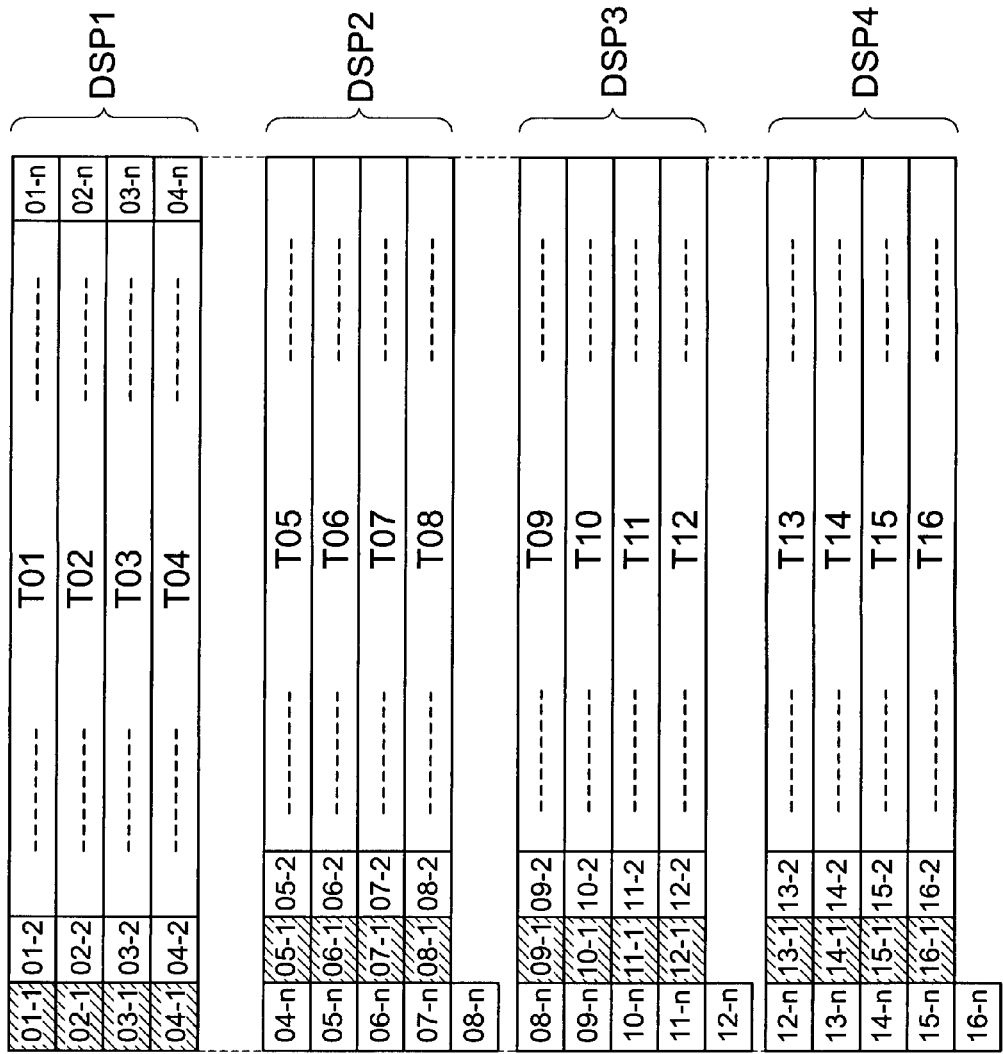
FIG. 10 is a view showing data signals inputted to memories via EMIFs of first to fourth DSPs.

FIG. 10 is a view showing another example of data signals inputted to memories via EMIFs of the first to fourth DSPs 25 to 28. In this example, similar to the example shown in FIG. 2, to the DSPs 26, 27, and 28, in addition to the signal arrays from the segmental charge transfer sections T05 to T08, T09 to T12, and T13 to T16 to be a processing target, data signals 04-$n$, 08-$n$, and 12-$n$ outputted last in the signal arrays from the segmental charge transfer sections T04, T08, and T12 are inputted as correcting data signals. In addition, these DSPs 26 to 28 carry out input of data signals in a manner adding a data signal outputted last from the segmental charge transfer section to the first in a signal array from the next segmental charge transfer section. As such, with the configuration shown in FIG. 9, it is possible to set the input configuration of data signals to the DSPs in various ways.

Figure 11:
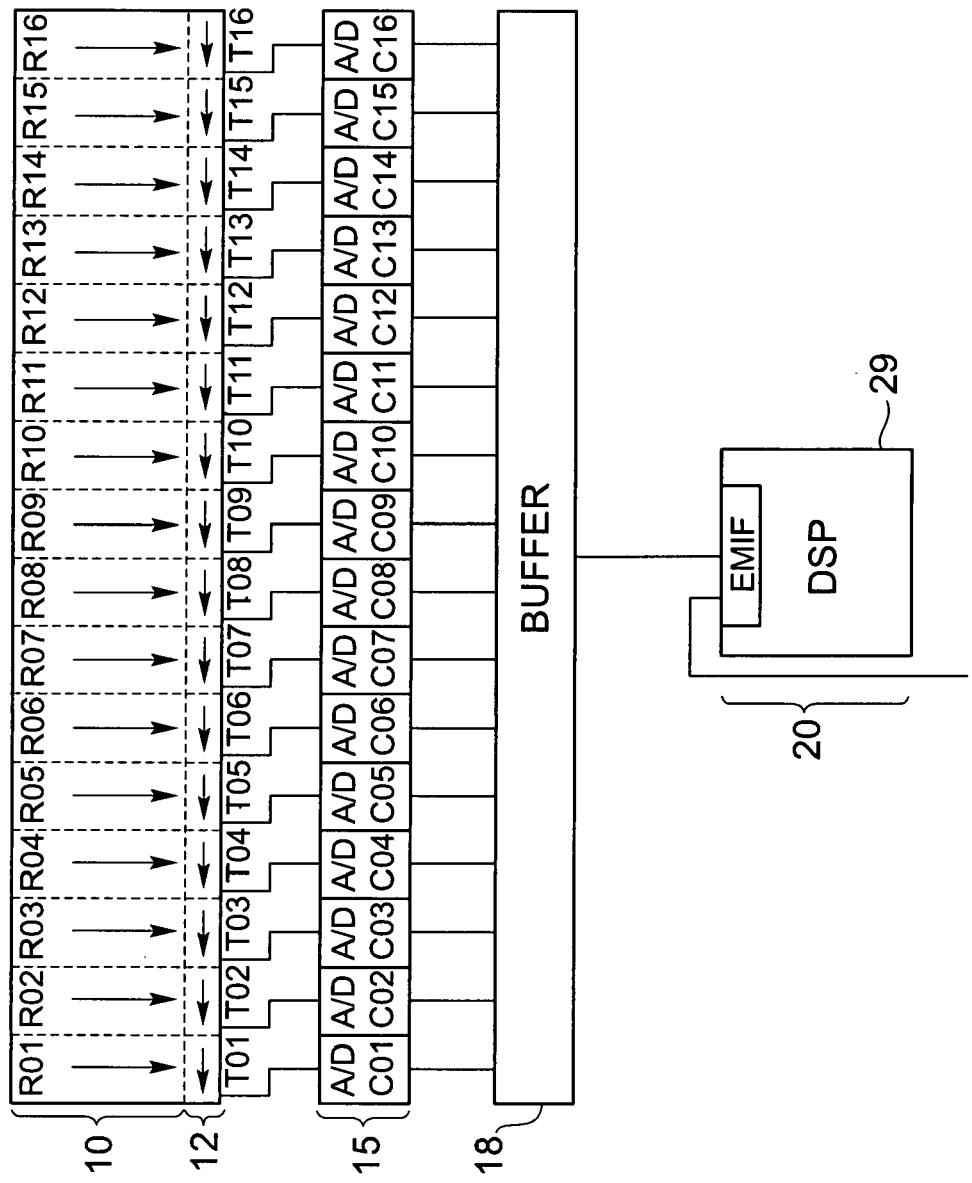
FIG. 11 is a block diagram showing a configuration of a third embodiment of an image pickup device.

FIG. 11 is a block diagram showing a configuration of a third embodiment of an image pickup device according to the present invention. An image pickup device 1C of the present embodiment includes a photodetecting section 10, a charge transfer section 12, an A/D converting section 15, and a digital signal processing section 20. Of these, the configurations of the photodetecting section 10, the charge transfer section 12, and the A/D converting section 15 are the same as those in the first embodiment. In addition, the data correcting method and the like in a signal processing carried out by the digital signal processing section 20 is also as mentioned above in terms of the first embodiment.

Data signals outputted from the A/D converters C01 to C16 are inputted to the digital signal processing section 20 for carrying out a predetermined signal processing for data signals. In the present embodiment, the digital signal processing section 20 is composed of one DSP 29. Moreover, in FIG. 11, a buffer 18 is provided between the A/D converting section 15 and the digital signal processing section 20. This buffer 18 is data storing means for temporarily storing data signals outputted from the A/D converting section 15. Data signals from the A/D converting section 15 are once taken into the buffer 18. Then, necessary data signals are inputted to the DSP 29 in sequence.

As such, when the digital signal processing section 20 is composed of one DSP 29, the configuration of the image pickup device 1C including the digital signal processing section 20 can be simplified. Moreover, with such a configuration, the input configuration of data signals from the A/D converting section 15 to the DSP of the digital signal processing section 20 is also simplified. Here, it is preferable to set the number of DSPs composing the digital signal processing section 20 while taking processing capability, processing speed, and the like of the DSPs into consideration.

FIG. 12 is a view showing an example of data signals inputted to a memory via an EMIF of the DSP 29. In the configuration shown in FIG. 11, data signals from all segmental charge transfer sections T01 to T16 composing the charge transfer section 12 are inputted to the identical DSP 29. Therefore, in this example, signal arrays from the first to the sixteenth segmental charge transfer sections T01 to T16 are just inputted into the DSP 29.

The image pickup device according to the present invention and the microscope apparatus using the same are not limited to the above-described embodiments and configuration examples, and can be variously modified. For example, in FIG. 8, the image pickup device 1A shown in FIG. 1 is used as imaging means in the microscope apparatus 3, however, as a matter of course, an image pickup device of another embodiment may be used.

Moreover, in all of the above-described embodiments, shown is a configuration where a data correction is carried out for data signals outputted from a single photodetecting section, however, it is also possible to employ, for example, a configuration where a data correction is carried out for data signals from three photodetecting sections corresponding to RGB. In this case, a configuration can be used where a data correction is carried out with regard to all data signals from one of the three photodetecting sections, then a data correction is carried out with regard to the two other photodetecting sections, in order. Alternatively, a configuration may be employed where three data signals from corresponding pixels in the three photodetecting sections are provided as a set of RGB data signals, and a data correction is carried out for the sets of these data signals, in sequence.

Here, it is preferable that the image pickup device includes: (1) photodetecting means that has a plurality of pixels arranged in an array form and outputs an electric charge generated according to an incident light amount in the pixel; (2) charge transfer means provided for the photodetecting means along one of the arrangement directions of the plurality of pixels and having N (N is an integer equal to or more than 2) segmental charge transfer sections divided in terms of the arrangement direction; (3) A/D converting means that converts signals by electric charges outputted from the photodetecting means via the charge transfer means to digital data signals; and (4) digital signal processing means that carries out a signal processing for the data signals outputted from the A/D converting means, and (5) the segmental charge transfer section transfers electric charges from pixels present in a predetermined photodetecting region of the photodetecting means in an output direction and outputs the same from an output end, and the digital signal processing means carries out, to a correction target of a data signal outputted first in a signal array from the segmental charge transfer section, a data correction by use of a plurality of correcting data signals including at least one of a first correcting data signal and a second correcting data signal while setting another predetermined data signal included in the signal array as the first correcting data signal, and a predetermined data signal included in another signal array from a segmental charge transfer section adjacent to an output end side of the segmental charge transfer section as the second correcting data signal.

Moreover, for the digital signal processing means, a configuration having M (M is an integer equal to or more than 2) digital signal processors to each of which signal arrays from one or a plurality of segmental charge transfer sections are inputted can be used.

In this case, it is preferable that, to the digital signal processor, in addition to the signal arrays from one or a plurality of segmental charge transfer sections to be a processing target, the second correcting data signal included in the other signal array from a segmental charge transfer section adjacent to an output end side thereof and being a processing target of a different digital signal processor is inputted. Consequently, even when a plurality of digital signal processors are used for a data correction for data signals, it becomes possible, in each thereof, to favorably execute a data correction in response to an abnormal output of data signals.

Alternatively, for the digital signal processing means, a configuration having one digital signal processor to which signal arrays from the N segmental charge transfer sections are inputted can be used.

Moreover, data storing means for temporarily storing the data signals outputted from the A/D converting means may be provided between the A/D converting means and the digital signal processing means. In this case, necessary data signals can be favorably inputted from the A/D converting means to one or each of the plurality of digital signal processors composing the digital signal processing means according to the concrete configuration of the digital signal processing means.

Moreover, it is preferable that the digital signal processing means carries out a shading correction to a correction target of all data signals included in the signal array from the segmental charge transfer section in addition to the data correction described above. Thereby, obtained image data is further improved in quality.

With regard to a concrete data correcting method for a data signal, for example, a method of the digital signal processing means carrying out, for the correction target data signal, the data correction to replace the correction target data signal by an average of the first correcting data signal and the second correcting data signal while setting a data signal outputted second in the signal array as the first correcting data signal, and a data signal outputted last in the other signal array as the second correcting data signal can be used.

Moreover, it is preferable that the digital signal processing means carries out the data correction to replace the correction target data signal by a correcting data signal while setting a data signal outputted second in the signal array as the correcting data signal when there is no segmental charge transfer section adjacent to an output end side of the segmental charge transfer section that outputs the correction target data signal. Alternatively, various methods other than these can also be used as data correcting methods for data signals.

Moreover, it is preferable that a microscope apparatus includes: the above-described image pickup device for acquiring an image by an optical image of a sample to be an observation target; a light guiding optical system that includes an objective lens into which light from the sample is made incident and which guides the optical image of the sample to the image pickup device; and image acquisition control means that controls acquisition of the image of the sample by the image pickup device.

INDUSTRIAL APPLICABILITY

The present invention can be used as an image pickup device capable of favorably reducing influence of an abnormal output produced in data signals and a microscope apparatus using the same.

The invention claimed is:
1. An image pickup device comprising:
photodetecting means that has a plurality of pixels arranged in an array form and outputs an electric charge generated according to an incident light amount in the pixel;
charge transfer means provided for the photodetecting means along one of the arrangement directions of the plurality of pixels and having N (N is an integer equal to or more than 2) segmental charge transfer sections divided in terms of the arrangement direction;
A/D converting means that converts signals by electric charges outputted from the photodetecting means via the charge transfer means to digital data signals;
digital signal processing means that carries out a signal processing to the data signals outputted from the A/D converting means,
each segmental charge transfer section transfers electric charges from pixels present in a predetermined photodetecting region of the photodetecting means in an output direction and outputs from an output end, and the digital signal processing means carries out, to a correction target of a data signal outputted first in a signal array from the segmental charge transfer section, a data correction by use of a plurality of correcting data signals including at least one of a first correcting data signal and a second correcting data signal while setting another predetermined data signal included in the signal array as the first correcting data signal, and a predetermined data signal included in another signal array from a segmental charge transfer section adjacent to an output end side of the segmental charge transfer section as the second correcting data signal, and
the digital signal processing means has M (M is an integer equal to or more than 2) digital signal processors each configured to receive signal arrays from the segmental charge transfer sections; and
data storing means for temporarily storing the data signals outputted from the A/D converting means, or a data selector circuit for providing data signals outputted from the A/D converting means to a corresponding digital signal processor, either the data storing means or the data selector holding a predetermined data signal and providing the predetermined data signal to another one of the digital signal processors as the correcting data signal, and either the data storing means or the data selector being provided between the A/D converting means and the digital signal processing means, wherein each digital signal processor is configured to receive the second correcting data signal included in a signal array from a segmental charge transfer section that is associated with an adjacent digital signal processor, the second correcting data signal being a processing target of the adjacent digital signal processor, via either the data storing means or the data selector circuit, in addition to the signal arrays from the segmental change transfer section that is associated with the digital signal processor.

2. The image pickup device according to claim 1, wherein the digital signal processing means carries out a shading correction to a correction target of all data signals included in the signal array from the sectional charge transfer section in addition to the data correction.

3. The image pickup device according to claim 1, wherein the digital signal processing means carries out, for the correction target data signal, the data correction to replace the correction target data signal by an average of the first correcting data signal and the second correcting data signal while setting a data signal outputted second in the signal array as the first correcting data signal, and a data signal outputted last in the other signal array as the second correcting data signal.

4. The image pickup device according to claim 1, wherein the digital signal processing means carries out the data correction to replace the correction target data signal by a correcting data signal while setting a data signal outputted second in the signal array as the correcting data signal when there is no segmental charge transfer section adjacent to an output end side of the segmental charge transfer section that outputs the correction target data signal.

5. A microscope apparatus comprising:
the image pickup device according to claim 1 for acquiring an image by an optical image of a sample to be an observation target;
a light guiding optical system that includes an objective lens into which light from the sample is made incident and which guides the optical image of the sample to the image pickup device; and
image acquisition control means that controls acquisition of the image of the sample by the image pickup device.

* * * * *